United States Patent [19]
Toda et al.

[11] Patent Number: 5,942,138
[45] Date of Patent: Aug. 24, 1999

[54] PROCESS OF PRODUCING LAMINAR STRUCTURE BY BONDING OF SHEET METAL BLANKS AFTER PRELIMINARY BONDING

[75] Inventors: Munetaka Toda, Kariya; Hideo Endo, Toyota; Takeo Nakagawa, Kawasaki, all of Japan

[73] Assignee: Toyota Jidosha Kabushiki Kaisha, Japan

[21] Appl. No.: 08/925,472

[22] Filed: Sep. 8, 1997

[30] Foreign Application Priority Data

Sep. 12, 1996 [JP] Japan ................................ 8-241786

[51] Int. Cl.$^6$ .................................................. B23K 26/14
[52] U.S. Cl. ................................ 219/121.72; 219/121.64; 219/121.84
[58] Field of Search ..................... 219/121.63, 121.64, 219/121.67, 121.72, 121.84, 136, 101; 228/182, 190; 433/8

[56] References Cited

U.S. PATENT DOCUMENTS

| | | | |
|---|---|---|---|
| 3,670,397 | 6/1972 | Lewis | 228/182 |
| 4,296,606 | 10/1981 | Reider | 219/101 |
| 4,603,089 | 7/1986 | Bampton | 219/121.64 |
| 5,016,807 | 5/1991 | Haack | 228/190 |
| 5,018,259 | 5/1991 | Wildman | 433/8 |
| 5,154,606 | 10/1992 | Wildman | 433/8 |
| 5,472,772 | 12/1995 | Jones | 219/136 |
| 5,609,288 | 3/1997 | Johnson | 219/121.64 |

FOREIGN PATENT DOCUMENTS

| | | | |
|---|---|---|---|
| 446714 | 9/1991 | European Pat. Off. | 219/121.64 |
| 57-102434 | 6/1982 | Japan . | |
| 60-102234 | 6/1985 | Japan . | |
| 63-81607 | 4/1988 | Japan . | |
| 2-220792 | 9/1990 | Japan | 219/121.72 |
| 5-53735 | 7/1993 | Japan . | |
| 8-321007 | 12/1996 | Japan . | |

OTHER PUBLICATIONS

"Concise Explanation Under Rule 98" (1 page), No Publication date.

*Primary Examiner*—Geoffrey S. Evans
*Attorney, Agent, or Firm*—Finnegan, Henderson, Farabow, Garrett & Dunner, L.L.P.

[57] ABSTRACT

Process of producing a laminar structure including metal sheets which are superposed on each other, wherein a plurality of sheet metal blanks corresponding to and having the same thickness values as the metal sheets, respectively, are superposed on each other, the process comprising the steps of (a) effecting preliminary bonding of two adjacent sheet metal blanks including an endmost one of the sheet metal blanks, by welding at predetermined portions of the two adjacent sheet metal blanks, when each of the plurality of sheet blanks is superposed as the endmost sheet blank on the other of the two adjacent sheet metal blanks, and (b) cutting the endmost sheet metal blank along a predetermined cutting line, after the preliminary bonding, by a laser beam generated from a laser cutting apparatus such that the laser beam spot formed on an exposed surface of the endmost sheet blank is moved along the cutting line.

10 Claims, 8 Drawing Sheets

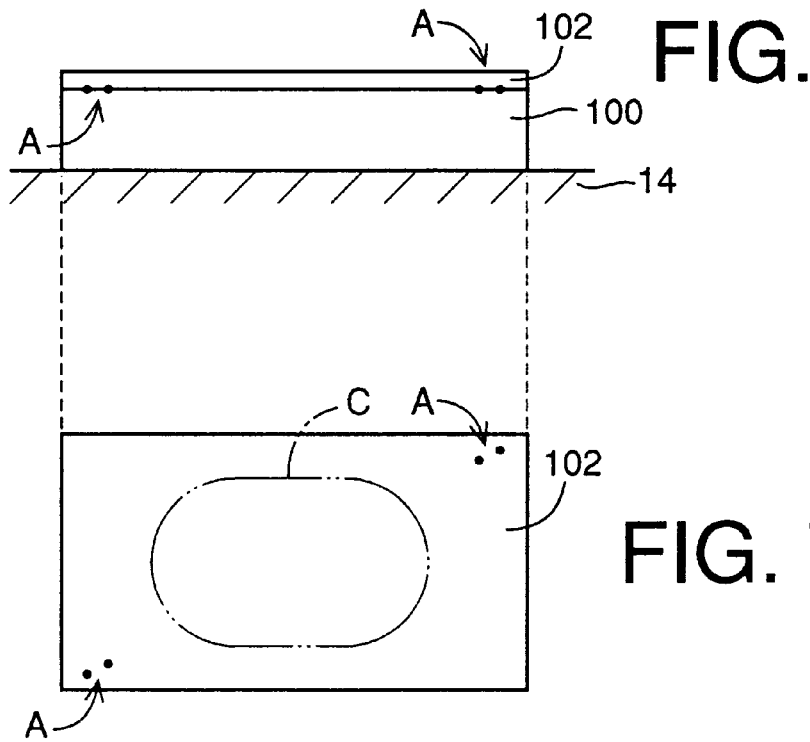
FIG. 7A
FIG. 7B
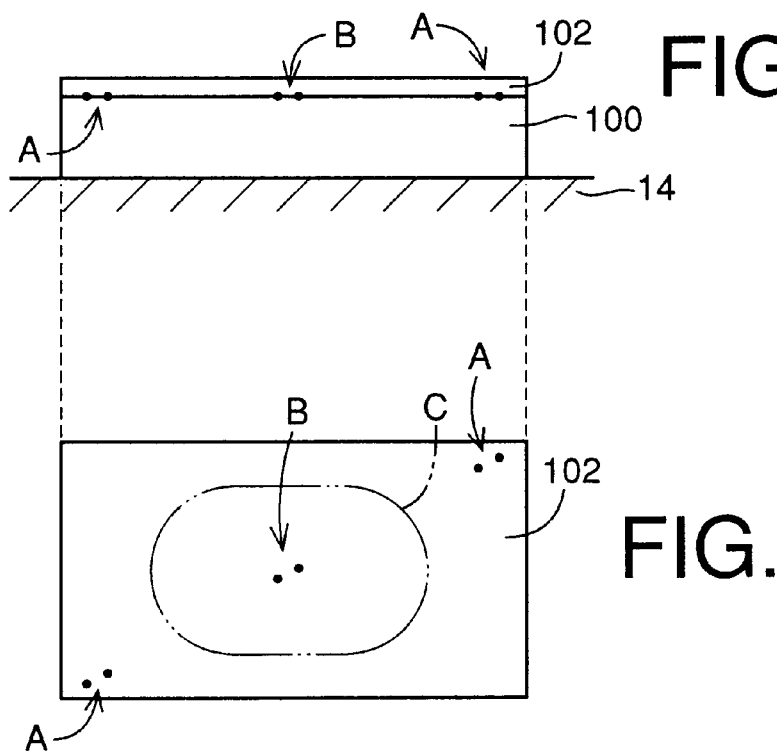
FIG. 8A
FIG. 8B

PROCESS OF PRODUCING LAMINAR STRUCTURE BY BONDING OF SHEET METAL BLANKS AFTER PRELIMINARY BONDING

CROSS REFERENCE TO RELATED APPLICATIONS

This application is based on Japanese Patent Application No. 8-241,786, filed September 1996, the content of which is incorporated hereinto by reference.

BACKGROUND OF THE INVENTION

1. Field of the Invention

The present invention relates in general to a process of producing a laminar product including a plurality of metal sheets superposed on each other, wherein a plurality of sheet metal blanks corresponding to the metal sheets are superposed on each other.

2. Discussion of the Related Art

An example of such a process is disclosed in JP-U-5-53735, wherein the product is conceptually divided into a plurality of constituent layers having respective outlines as seen in the direction of thickness of the layers. A plurality of sheet metal blanks corresponding to and having the same thickness values as these conceptual constituent layers are laser cut along respective predetermined cutting lines to form respective metal sheets whose outlines are identical with those of the corresponding constituent layers. The thus prepared metal sheets are superposed on each other. When each metal sheet is superposed on another, these two adjacent metal sheets are bonded together by welding. In this way, the product is produced by subjecting each of the sheet blanks to the cutting step and subjecting each of the metal sheets to the bonding step.

In the conventional process of producing a laminar structure, the sheet blanks are cut before these blanks (i.e., metal sheets) are superposed on each other and bonded together. When each of the individual sheet blanks is cut, it must be suitably positioned and held at the predetermined position. Further, the sheet blanks must be positioned again when they are superposed on each other and bonded together. Therefore, the conventional process requires positioning of each of the sheet blanks not only during the cutting operation but also during the bonding operation, undesirably increasing the required time and cost for producing the product.

SUMMARY OF THE INVENTION

It is therefore an object of the present invention to provide a process which permits efficient and economical production of a laminar structure including a plurality of metal sheets superposed on each other.

The above object may be achieved according to the principle of the present invention, which provides a process of producing a laminar structure including a plurality of metal sheets which are superposed on each other, wherein a plurality of sheet metal blanks corresponding to and having same thickness values as the plurality of metal sheets, respectively, are superposed on each other, the process comprising the steps of: (a) effecting preliminary bonding of two adjacent ones of the sheet metal blanks including an endmost one of the sheet metal blanks, by welding at predetermined portions of the two adjacent sheet metal blanks, when each of the plurality of sheet metal blanks is superposed as the endmost sheet metal blank on the other of the two adjacent sheet metal blanks; and (b) cutting the endmost sheet metal blank along a predetermined cutting line, after the preliminary bonding, by a laser beam generated from a laser cutting apparatus such that a spot of the laser beam formed on an exposed surface of the endmost sheet metal blank is moved along the cutting line.

In the process of the present invention described above, each sheet blank superposed on another sheet blank is subjected to the preliminary bonding step and the cutting step in this order, so that each sheet blank is cut after it is provisionally bonded to the adjacent sheet blank by the preliminary welding. Since each sheet blank is superposed on another sheet blank before it is cut to have the predetermined outline, each sheet blank need not be accurately positioned relative to the adjacent sheet blank. Further, each sheet blank is provisionally bonded to the adjacent sheet blank by the preliminary welding before it is cut, it is not necessary to position and hold the sheet blank during the cutting operation.

Accordingly, the present process permits more efficient and economical production of the laminar structure, than the conventional process in which the sheet blanks are initially cut to have the respective outlines and are then superposed on each other and bonded together.

The product may be an end product, or a mold, die set or other pattern used for producing the end product.

The welding performed in the preliminary bonding step to bond the two adjacent sheet blanks may be effected continuously along a predetermined preliminary bonding line, or at selected at least one spot or point, on the endmost sheet blank. The welding may be spot welding or pin-point welding, which may be achieved by a suitable welding apparatus such as a resistance welding apparatus or a laser welding apparatus. In the pin-point welding, the size of the welding spot is comparatively small.

The sheet blanks may be determined so as to correspond respective constituent layers into which the product is conceptually divided. These conceptual constituent layers and the corresponding sheet blanks are determined such that the two adjacent layers or sheet blanks have the same thickness value or respective different thickness values. In the latter case, the sheet blanks (constituent layers) are determined such that the adjacent sheet blanks have different outlines or contours as seen in the direction of thickness of the sheet blanks. In this case, the total number of the sheet blanks may be reduced.

The sheet blanks may be made of a steel or other suitable metal such as aluminum and copper. The laser cutting apparatus used for cutting the endmost sheet layer may be adapted to generate a carbon dioxide gas laser or YAG laser.

The spot of the laser beam may be moved along the predetermined cutting line by moving at least one of the laser cutting apparatus and the endmost sheet blank.

The endmost sheet blank is the sheet blank at the end of a stack of the mutually superposed sheet blanks, and is usually the uppermost sheet blank.

In a first preferred form of the present invention, the two adjacent sheet blanks are welded together in the preliminary bonding step, at predetermined position or positions which is/are spaced from the predetermined cutting line of the endmost sheet blank. If the welding spots lie on the cutting line, the endmost sheet blank is hardened at those spots when the endmost sheet blank is cut along the cutting line. In the present form of the invention, the product does not have locally hardened portions on its surface which is defined by the cut surfaces of the sheet blanks. Accordingly, the hardness of the surface of the product is made even over the entire area, resulting in improved quality of the product. This is particularly desirable where the product is a die set used for a sheet metal stamping operation. Namely, a part manufactured by pressing using the die set does not have flaws due to the locally hardened portions of the surface or surfaces of the die set (upper and lower dies).

In a second preferred form of this invention, the step of cutting the endmost sheet metal blank comprises blowing a gas toward the spot of the laser beam, and the step of effecting preliminary bonding comprises welding together the two adjacent sheet metal blanks at at least one predetermined position which is spaced from the predetermined cutting line of the endmost sheet blank, the at least one predetermined position being determined such that a portion of the endmost sheet metal blank adjacent to the spot of the laser beam is buckled or warped slightly apart from the other of the two adjacent sheet metal blanks, in the presence of the gas in a gap between the two adjacent sheet metal blanks as a result of a flow of the gas through an opening which is formed through the endmost sheet metal blank due to melting of a metallic material thereof by irradiation with the laser beam.

For efficiently effecting the laser cutting of the endmost sheet metal blank, it is desirable to blow a suitable gas toward the spot of the laser beam on the exposed surface of the endmost sheet blank, in the same direction as the laser beam. The gas is effective to blow off or discharge the metal which is melted by the laser beam, and an oxide of the molten metal. To facilitate the removal of the molten metal from the sheet blank, it is preferred that a sufficiently large gap be present between the endmost sheet blank and the adjacent sheet blank, so that the molten metal can be easily blown off through the gas, and so that the molten metal can easily and efficiently flow into the gap through the opening formed through the endmost sheet blank, as a result of a smooth flow of the molten metal through the gap. In the absence of the gas indicated above, the gap between the two adjacent sheet blanks including the endmost sheet blank which is subjected to the laser cutting operation.

In the second preferred form of the present process described above, a gas is blown toward the spot of the laser beam, and the the two adjacent sheet metal blanks are bonded together at a predetermined position or positions thereof which is/are spaced from the predetermined cutting line of the endmost sheet blank and which is/are determined such that a portion of the endmost sheet metal blank adjacent to the laser beam spot is warped or levitated slightly apart from the other or adjacent sheet metal blank, owing to the gas existing in the gap between the two adjacent sheet blanks, as a result of a flow of the gas through the opening formed through the endmost sheet metal blank due to melting of its metallic material by irradiation with the laser beam.

In the process according to the second preferred form of the invention, the two adjacent sheet blanks are provisionally bonded together at the suitably selected position or positions so that the portion of the endmost sheet blank near the laser-irradiated portion is levitated or warped apart from the adjacent sheet blank, creating a gap between these two adjacent sheet blanks, which is large enough to permit efficient removal of the molten metal from the sheet blanks. In the present arrangement, the endmost sheet blank can be cut efficiently by the laser beam, without adversely influencing the adjacent sheet blank, by adjusting the power of the laser beam and the pressure of the gas so that only the endmost sheet blank is melted and cut by the laser beam. The gap is effective to permit only the endmost sheet blank to be cut, even if the focal point of the laser beam is more or less offset from the nominal point.

The gas may be an assist gas such as air, and oxygen or other active gases, which has not only a function of blowing off substances which may be produced due to the laser cutting and which may reduce the cutting ability of the laser beam or deteriorate the quality of the cut surface, but also a function of promoting oxidization of the material of the sheet metal blanks. Alternatively, the gas may be a shield gas such as nitrogen, argon, helium or other inert gases, which has not only the function of blowing off the above-indicated substance, but also a function of preventing the oxidization of the material of the sheet metal blanks.

In a third preferred form of the present invention, the process further comprises a step of effecting final bonding of the two adjacent sheet metal blanks, at at least one predetermined position which is close to and spaced from the predetermined cutting line, after the step of cutting the endmost sheet metal blank, when each of the plurality of sheet metal blanks is superposed as the endmost sheet metal blank on the other of the two adjacent sheet metal blanks.

In the above third preferred form of the process, each sheet blank is subjected to the preliminary bonding and the final bonding when it is superposed on another sheet blank. The preliminary bonding may be adapted to permit a portion of the endmost sheet blank to be warped or levitated in the laser cutting step, for increasing the efficiency of the laser cutting operation, while the final bonding may be a primary bonding operation adapted to firmly bond the two adjacent sheet blanks together with a sufficiently large bonding force.

In one advantageous arrangement of the above third preferred form of the process, the final bonding step may be effected by a laser beam generated by a laser welding apparatus. In this case, the cutting step and this final bonding step may be achieved by the same laser cutting and welding apparatus, and the size and cost of the equipment for performing these two steps can be significantly reduced.

In another advantageous arrangement of the above third preferred form of the invention, the process further comprises a step of forming at least one hole in at least one portion of the endmost sheet metal blank, respectively, which at least one portion is located at the above-indicated at least one predetermined position at which the final bonding is effected. Each hole is formed by irradiation with a laser beam. In this arrangement, the step of effecting final bonding comprises emitting a laser beam toward each hole formed through the endmost sheet blank.

In the above arrangement, the endmost sheet blank is irradiated with a laser beam to form a hole or holes, and is again irradiated with a laser beam at each hole, so that the final bonding is effected by emitting a laser beam toward the hole or holes formed prior to the final bonding step. In this respect, the step of forming the hole or holes may be considered a part of the final bonding step.

Accordingly, the amount of energy required to effect the step of forming the hole or holes and the amount of energy required to effect the final bonding step can be reduced, as compared with the energy amount required to effect the final bonding step without the prior formation of the hole or holes. The energy amount may be represented by a product of the laser power and the speed of moving the laser beam spot relative to the endmost sheet blank. Hence, the final bonding speed can be increased, and the power of the laser required for forming the at least one hole and the power of the laser required for effecting the final bonding step can be made equal to that required for effecting the cutting step, whereby those three steps can be performed with improved efficiency.

The above-indicated at least one hole may be at least one through-hole formed through the endmost sheet blank, so that the corresponding local area of the adjacent sheet blank is irradiated with the laser beam. Alternatively, the at least one hole may be at least one recess having a bottom, so that the endmost sheet blank is locally thinned.

In a fourth preferred form of the process of the invention, the laminar structure includes a plurality of parts which have respective surfaces engageable with each other and which include at least two parts that are formed from the plurality of sheet metal blanks such that the above-indicated at least two parts engage each other.

The process according to the above fourth preferred form of this invention permits more efficient and economical production of the plurality of parts, with reduced wasting of the material, as compared with the process in which those parts are produced separately and independently of each other.

The laminar product including the plurality of parts indicated above may be a die set including an upper die and a lower die, or a die set including an upper die, a lower die, and a pressure ring or binder ring which is disposed around the upper die and/or the lower die which cooperates with the upper die and/or the lower die, to hold a blank or workpiece to be subjected to a pressing operation.

In one advantageous arrangement of the above fourth preferred form of the process, the plurality of sheet metal blanks include two adjacent blanks which include respective sections which are separated from each other when the above-indicated at least two parts are separated from each other after these at least two parts have been produced, and the step of effecting preliminary bonding comprises pin-point welding of said sections of the two adjacent blanks. The pin-point welding is a welding operation in which the diameter of a weld nugget is comparatively small, for instance, approximately equal to the thickness of each sheet blank. The pin-point welding may be effected by a resistance welding apparatus or a laser welding apparatus. The point-point welding is effective to prevent displacement of the two adjacent sheet blanks relative to each other, but permits the welded sheet blanks to be separated from each other with a relatively small force.

BRIEF DESCRIPTION OF THE DRAWINGS

The above and optional objects, features, advantages and technical and industrial significance of the invention will be better understood by reading the following detailed description of presently preferred embodiments of the invention, when considered in connection with the accompanying drawings, in which:

FIGS. 7A and 7B are a front elevational view in cross section and a plan view for explaining step S104 of the flow chart of FIG. 4;

FIGS. 8A and 8B are a front elevational view in cross section and a plan view for also explaining the step S104;

DETAILED DESCRIPTION OF THE PREFERRED EMBODIMENTS

Figure 13:
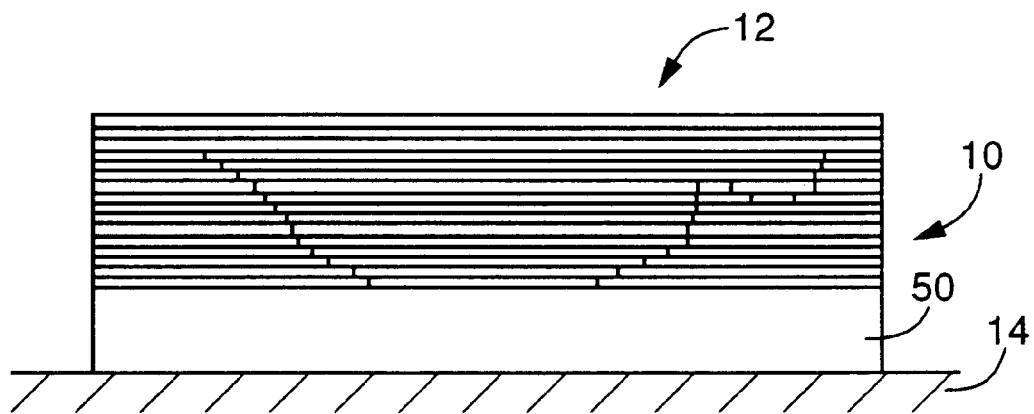
FIG. 13 is a front elevational view in cross section for explaining step S110 of the flow chart of FIG. 4.
Figure 14:
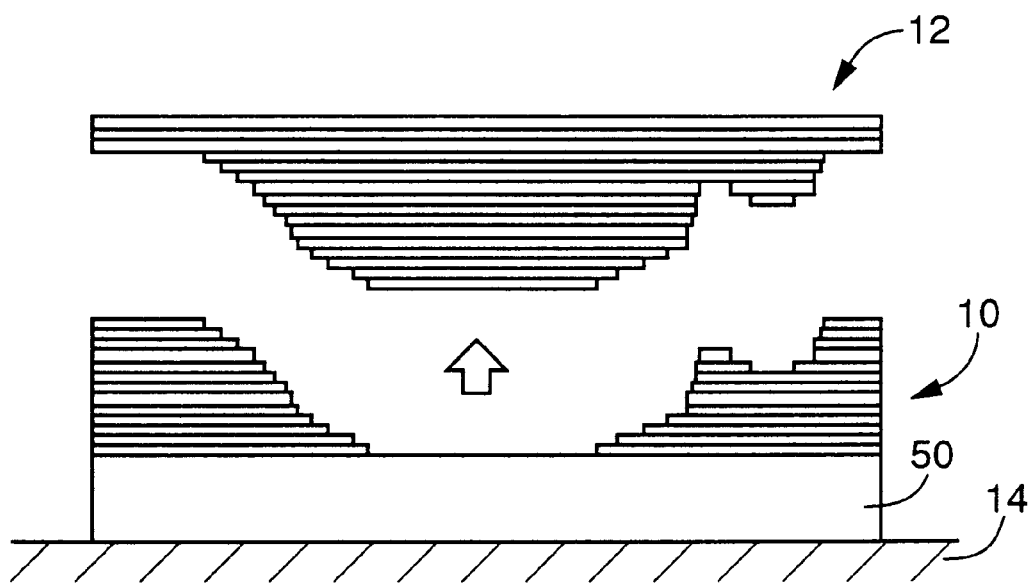
FIG. 14 is a front elevational view in cross section for explaining step S111 of the flow chart of FIG. 4.

Referring to the accompanying drawings, there will be described in detail a process of producing a laminar product in the form of a die set for a sheet metal stamping operation, according to one embodiment of the present invention. As shown in FIGS. 13 and 14, the die set consists of a lower die 10 and an upper die 12 which are moved toward and away from each other in a stamping operation on a stamping machine. The lower and upper dies 10, 12 have respective upper and lower surfaces which are engageable with each other. The die set 10, 12 is produced from a plurality of sheet metal blanks corresponding to a plurality of constituent layers into which the die set is conceptually divided. The sheet metal blanks are superposed on each other to form a stack on a horizontal top surface of a table 14, as indicated in FIG. 13. Each time one sheet blank is placed on another sheet blank, the former sheet blank is subjected to a preliminary bonding step, a cutting step and a primary or final bonding step, as described below in detail. The lower and upper dies 10, 12 produced according to the present process are separated from each other as indicated in the cross sectional view of FIG. 14.

The preliminary bonding step is a step of spot welding the mutually superposed two adjacent sheet metal blanks for provisionally bonding them together to maintain their relative position. The two adjacent sheet metal blanks includes the endmost sheet blank, that is, the uppermost sheet blank at the top of the stack of the sheet blanks. The cutting step is a step of laser cutting the uppermost sheet blank along a predetermined cutting line, to give the sheet blank a predetermined outline as seen in a plane perpendicular to the direction of lamination or superposition of the sheet blanks. The final bonding step, which is effected after the cutting step, is a step of laser welding the adjacent sheet blanks along predetermined welding lines, to increase the bonding strength therebetween.

The preliminary bonding step is preliminary in the sense that it is effected prior to the cutting step, and in the sense that it is effected prior to the final or primary bonding step.

Figure 2:
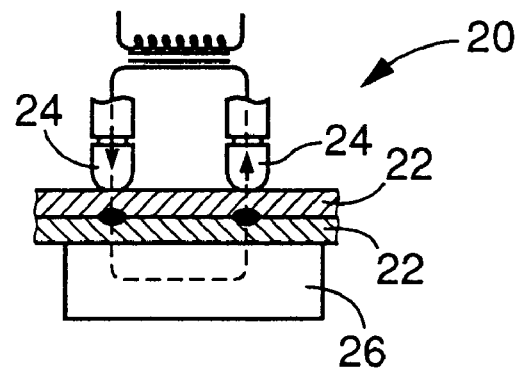
FIG. 2 is a side elevational view schematically showing a resistance welding apparatus used in the process of FIG. 1.
Figure 3:
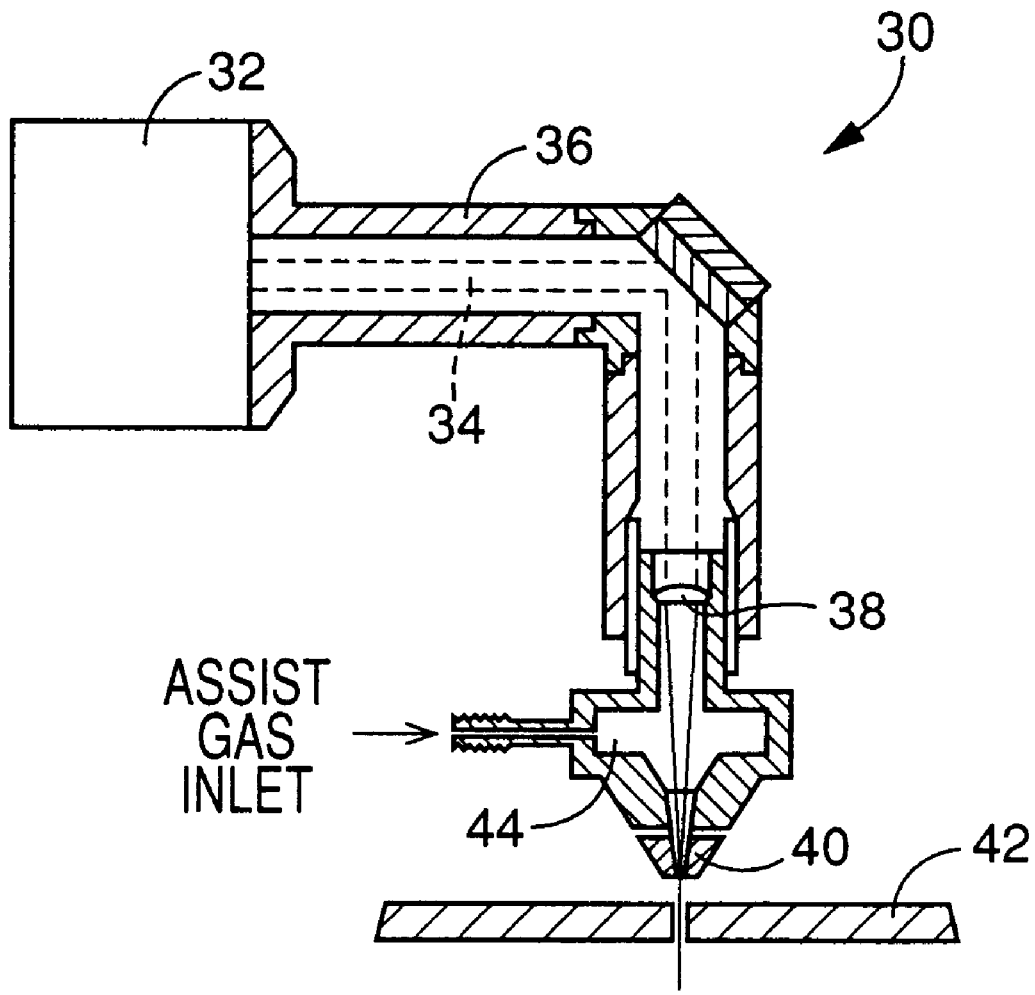
FIG. 3 is a cross sectional view showing a laser cutting and welding apparatus used in the process of FIG. 1.

The preliminary bonding step is effected by a spot welding apparatus in the form of a resistance welding apparatus 20 of series type as shown in FIG. 2, while the cutting and final bonding steps are effected by a laser cutting and welding apparatus 30 as shown in FIG. 3. The resistance welding apparatus 20 has a plurality of movable electrodes 24 and a stationary electrode 26. Two adjacent sheet blanks 22, 22 made of metal are interposed and sandwiched by and between the movable electrodes 24 positioned on one side thereof and the stationary electrode 26 positioned on the other or opposite side thereof. An electric current is applied between the movable and stationary electrodes 24, 26, so that the electric current flows in series through two or more corresponding local portions of the sheet blanks 22, so that the two sheet blanks 22, 22 are bonded together at the local portions.

The laser cutting and welding apparatus 30, which is adapted to use an assist gas 44, includes a laser source 32, a torch 36 and a condenser lens 38, as shown in FIG. 3. A laser beam 34 generated by the laser source 32 is guided along a path in the torch 36, and incident upon the condenser lens 38 so that the condensed layer beam 34 is emitted toward an upper surface of a metallic blank 42 through a nozzle 40 provided at the free end of of the torch 36. The nozzle 40 is adapted to receive the assist gas 44, so that the assist gas 44 is blown toward the laser spot on the surface of the blank 42. The apparatus 30 has a moving device for moving the torch 36 and the blank 42 relative to each other in a direction parallel to the upper surface of the blank 42, and a second moving device for moving the torch 36 and the blank 42 in a direction intersecting the upper surface of the blank 42, usually, in the direction perpendicular to the surface. The relative movement by the first moving device controls a path taken by the spot of the laser beam 34 on the surface of the blank 42, while the relative movement by the second moving device controls a focal point of the laser beam 34 emitted from the nozzle 40.

Figure 4:
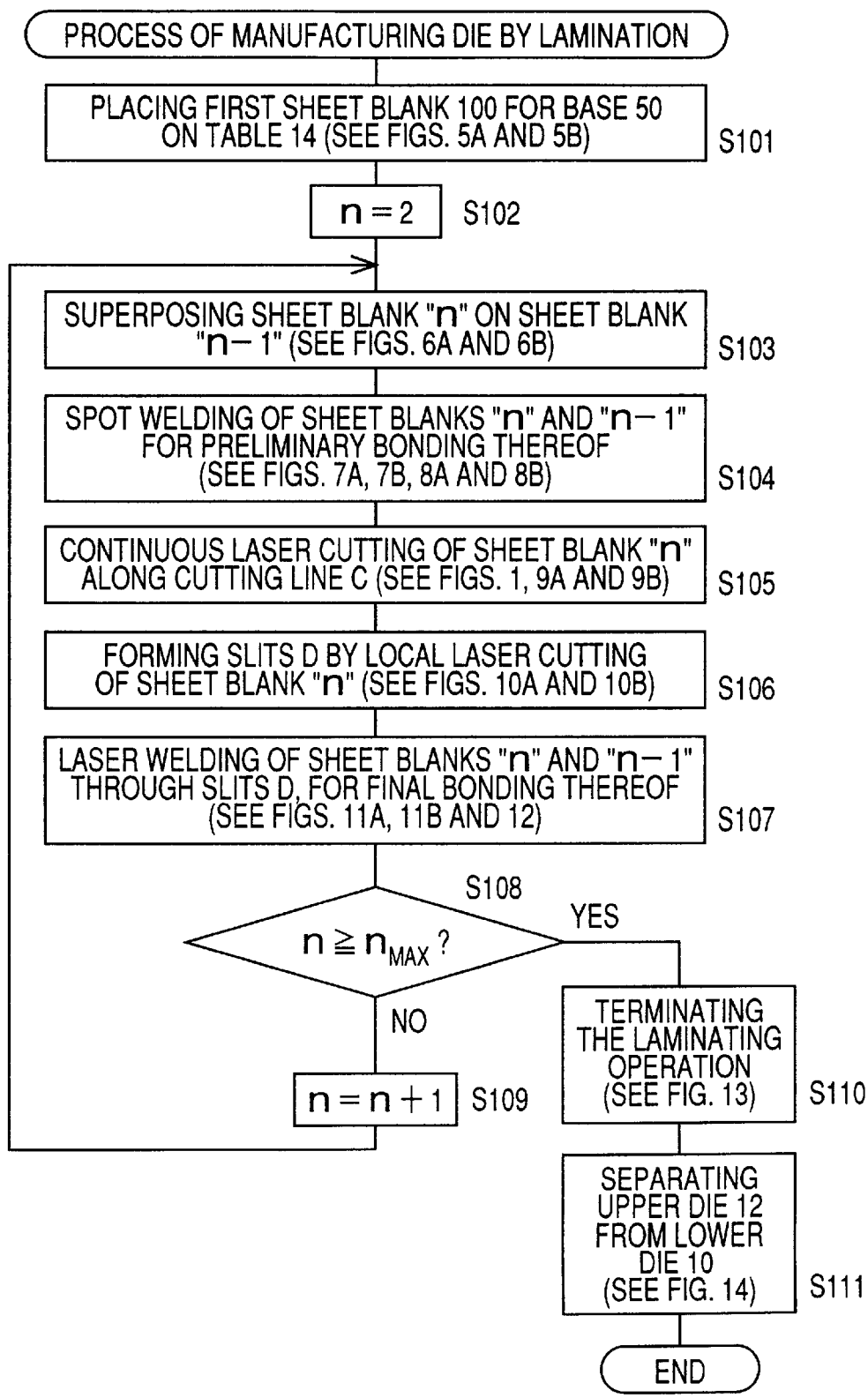
FIG. 4 is a flow chart illustrating process steps implemented in the process of FIG. 1.
Figure 5A:
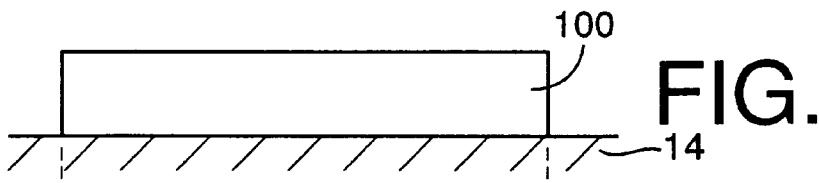
FIGS. 5A and 5B are a front elevational view and a plan view for explaining step S101 of the flow chart of FIG. 4.
Figure 5B:
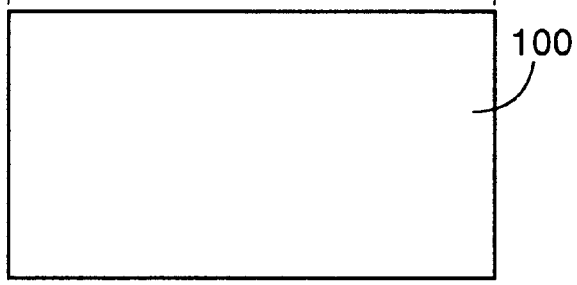

Referring next to the flow chart of FIG. 4, the process of producing the die set 10, 12 of FIGS. 13 and 14 will be described. The process is initiated with step S101 in which a first sheet blank 100 is placed on the table 14, as indicated in FIG. 5A. The first sheet blank 100 is a lowermost one of a plurality of sheet blanks corresponding to a plurality of constituent layers into which the product in the form of the die set 10, 12 is conceptually divided. Each sheet blank has the same thickness as the corresponding constituent layer. The first or lowermost sheet blank 100 corresponds to the lowermost one of the constituent layers of the die set 10, 12, namely, a base 50 of the lower die 10 shown in FIGS. 13 and 14. The first sheet blank 100 has the same outline as the outline of the base 50, and need not be cut to generate the outline of the base 50. In other words, the first sheet blank 100 forms the base 50, without the cutting step. In the present embodiment, the die set 10, 12 is conceptually divided into constituent layers so that the adjacent constituent layers have different outlines and may have the same thickness value or respective different thickness values.

Figure 6A:
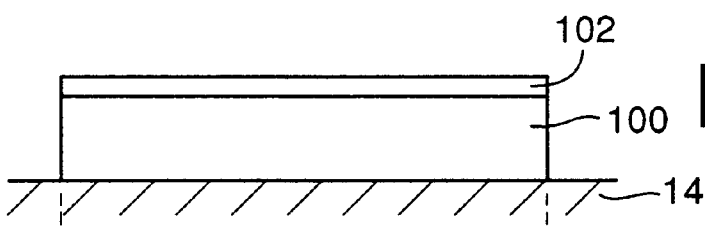
FIGS. 6A and 6B are a front elevational view and a plan view for explaining step S103 of the flow chart of FIG. 4.
Figure 6B:
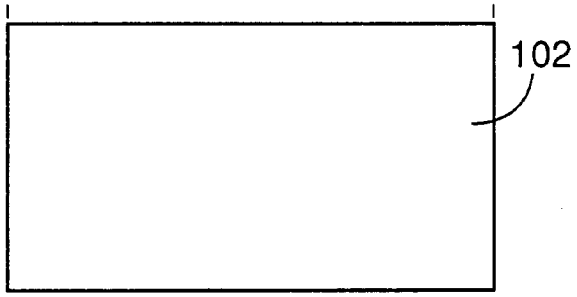

Step S101 is followed by step S102 in which a value "n" indicative of the identification number of the sheet blanks is incremented to "2". Then, the process flow goes to step S103 in which the sheet blank indicated by the value "n" (hereinafter referred to as sheet blank "n") is placed on the preceding sheet blank indicated by the value "n−1" (hereinafter referred to as sheet blank "n−1"). When step S103 is implemented for the first time, the value "n" is "2", a second sheet blank 102 is placed on the first sheet blank 100, as indicated in FIG. 6A.

Step S103 is followed by step S104 in which the sheet blanks "n" and "n−1" are spot welded together by the resistance welding apparatus 20.

The sheet blanks "n" and "n−1" are spot welded at predetermined welding spots which are spaced from not only the predetermined cutting line of the sheet blank "n" but also the predetermined cutting line of the sheet blank "n−1". The spot welding is effected for each of the sections of each of the sheet blanks "n" and "n−1", which sections are separated from each other by cutting along the cutting line. In the present embodiment wherein the die set consisting of the lower and upper dies 10, 12 is produced by lamination, each of the sheet blanks except the first sheet blank 100 (for the base 50 of the lower die 10) is cut into two sections which constitute respective parts of the lower and upper dies 10, 12. Each of those sheet blanks is spot welded at each of the above-indicated two sections. Further, each of the welding spots is selected so that the sheet blank "n" is levitated or warped by the assist gas 44, away from the top surface of the adjacent lower sheet blank "n−1", at local portions of the sheet blank "n" including a local portion irradiated by the laser beam 34 in the subsequent laser cutting step in which the assist gas 44 is blown against the laser-irradiated portion of the sheet blank "n", as described below in detail.

When the value "n" is equal to "2", the sheet blank "n−1" is the first sheet blank 100 while the sheet blank "n" is the second sheet blank 102. In this instance, the second sheet blank 102 is spot welded to the first sheet blank 100.

The predetermined cutting line for the second sheet blank 102, which is indicated at C in FIG. 7B, divides the second sheet blank 102 into an outer section corresponding to the lower die 10 and an inner section corresponding to the upper die 12. For the outer portion of the second sheet blank 102, normal spot welding is effected at two spots indicated at A in FIGS. 7A and 7B. These two welding spots A are selected to be as distant as possible from each other so that the portion of the outer section of the second sheet blank 102 which is adjacent to the cutting line C can be easily and stably levitated or warped away from the top surface of the first sheet blank 100. Further, the two sheet blanks 100, 102 are spot welded at the two spots A within the outer section of the second sheet blank 102, in order to prevent the second sheet blank 102 from being displaced or dislocated relative to the first sheet blank 100 in the subsequent laser welding step.

For the inner section of the second sheet blank 102, on the other hand, pin-point spot welding is effected at single spot B, as indicated in FIGS. 8A and 8B. This pin-point welding spot B is located at a midpoint of a straight segment connecting the normal spot welding spots A. In this respect, it is noted that the inner section of the second sheet blank 102 constitutes a part of the upper die 12, and should be separated at its lower surface from the first sheet blank 100 which constitutes the base 50 of the lower die 10, as is apparent from FIG. 14. In view of this fact, the pin-point spot welding is effected at the spot B within the inner section, such that the weld nugget has a comparatively small diameter, to provide a comparatively small welding force. The pin-point welding is provided at the inner section of the second sheet blank 102 to prevent displacement of the inner section of the second sheet blank 102 relative to the first sheet blank 100 upon laser cutting of the second sheet blank 102, and to permit easy removal of the upper die 12 from the lower die 10 at the pin-point welding spot B, without an adverse influence, when the upper and lower dies 12, 10 are moved away from each other after the die set is produced according to the present process.

The pin-point spot welding indicated above is effected for bonding only the inner section of the second sheet blank 102 to the first sheet blank 100. For the third and subsequent sheet blanks ("n"≧3), the normal spot welding is effected for preliminary bonding of the adjacent sheet blanks "n" and "n−1", for each of the sections of the blank layer "n" separated from each other by at least one predetermined cutting line.

Figure 9A:
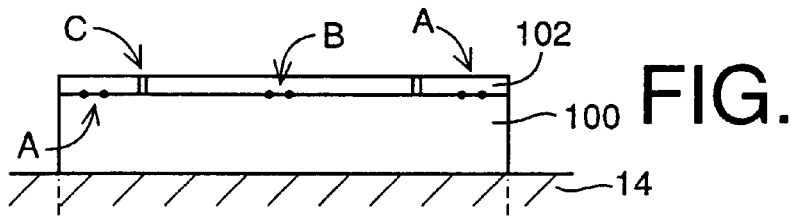
FIGS. 9A and 9B are a front elevational view in cross section and a plan view for explaining step S105 of the flow chart of FIG. 4.
Figure 9B:
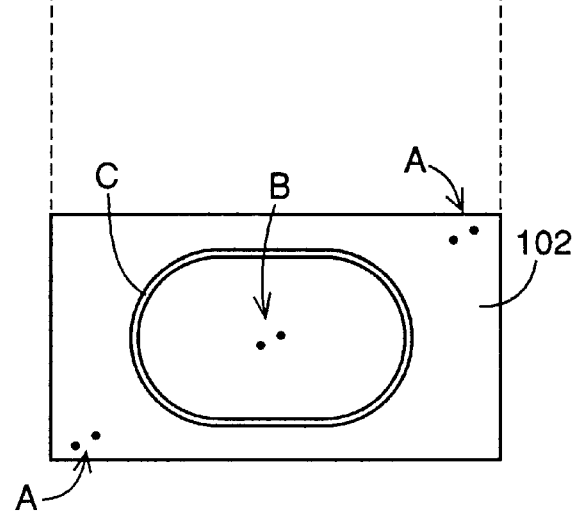

Then, step S105 is implemented so that the sheet blank "n" is continuously cut by the laser cutting and welding apparatus 30, along the predetermined cutting line C, which defines the inner and outer contours of the outer and inner sections of the sheet blank "n" which are separated from each other by the laser cutting, that is, the inner and outer contours of the lower and upper dies 10, 12. Where the value "n" is equal to "2", the second sheet blank 102 is laser cut continuously along the predetermined cutting line C, as indicated in FIGS. 9A and 9B.

Figure 1:
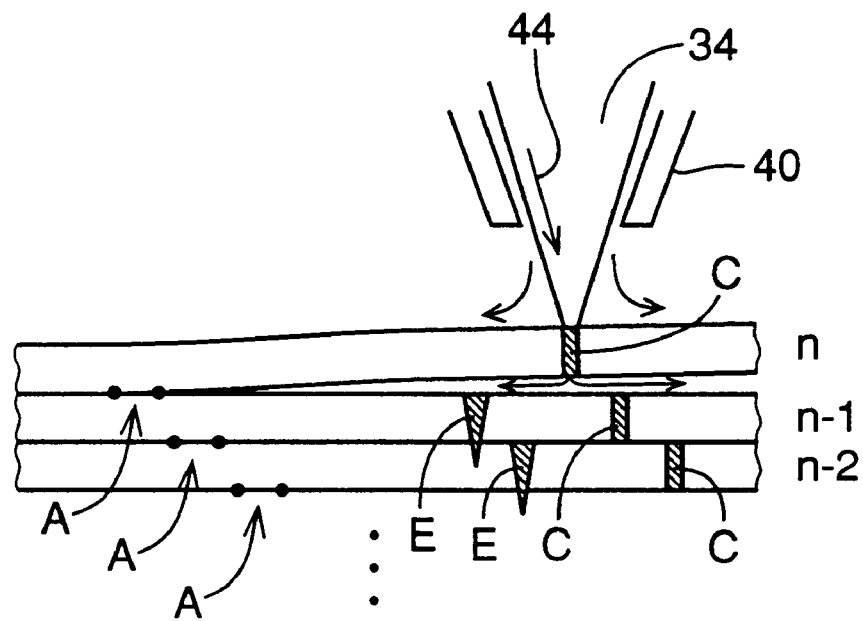
FIG. 1 is a cross sectional view showing a process of producing a laminar product according to one embodiment of this invention.

FIG. 1 shows the details of the laser cutting in step S105, at a certain point of the process at which a plurality of sheet blanks (from the first sheet blank to the sheet blank "n−1") which have been superposed on each other have been subjected to the preliminary bonding step (spot welding at the spots A), the laser cutting step by the laser beam 34 (laser cutting along the cutting lines C), and the final bonding step (laser welding at spots E) which will be described. Further, the present or uppermost sheet blank "n" superposed on the sheet blank "n−1" has been subjected to the preliminary bonding step (spot welding at the spots A). In this condition, the uppermost sheet blank "n" is cut along the predetermined cutting line C by the laser beam 34. To cut only the uppermost sheet blank "n" through its thickness, the power and focal point of the laser beam 34, the velocity of movement of the laser beam spot along the cutting line C (i.e., the cutting speed), and the pressure of the assist gas 44 to be blown from the nozzle 40 are determined depending upon the material and thickness of the uppermost sheet blank "n".

With the laser beam 34 irradiating the upper surface of the sheet blank "n" along the cutting line C, the metal is melted due to heat generated by the laser beam 34, whereby a slit is formed through the sheet blank "n" along the cutting line C. In this cutting step, the assist gas 44 blown from the nozzle 40 toward the irradiated portion of the sheet blank "n" in the direction indicated by arrows in FIG. 1 flows through the slit and reaches the underside of the sheet blank "n", thereby causing the sheet blank "n" to be slightly levitated or warped apart from the sheet blank "n−1", at the portion near the laser-irradiated portion (near the cutting line C or the slit formed), whereby there is formed a considerable gap or clearance between the opposed surfaces of the sheet blanks "n" and "n−1". A test confirmed the levitation of the uppermost blank layer "n" apart from the adjacent sheet blank "n−1", at the portion near the laser-irradiated portion of the sheet blank "n", under the following condition:

Material of the blank layer "n": Soft steel
Thickness of the blank layer "n": Approx. 0.5–2 mm
Pressure of the assist gas 44: Approx. 2–4kg/cm$^2$
Distance between the spot welding spot A and the cutting line C: Approx. 50 mm As a result of formation of the gap between the sheet blanks "n" and "n−1", a molten metal produced by the irradiation of the sheet blank "n" by the laser beam 34, and an oxide of the molten metal can be effectively discharged from gap into the ambient atmosphere by a stream of the assist gas 44 flowing through the gap. In the present embodiment, the gap assures effective removal of the molten metal, and permits only the uppermost blank layer "n" to be laser cut, without a significant damage to the adjacent lower sheet blank "n−1".

Figure 10A:
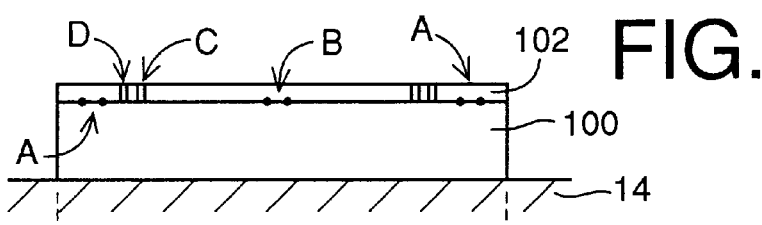
FIGS. 10A and 10B are a front elevational view in cross section and a plan view for explaining step S106 of the flow chart of FIG. 4.
Figure 10B:
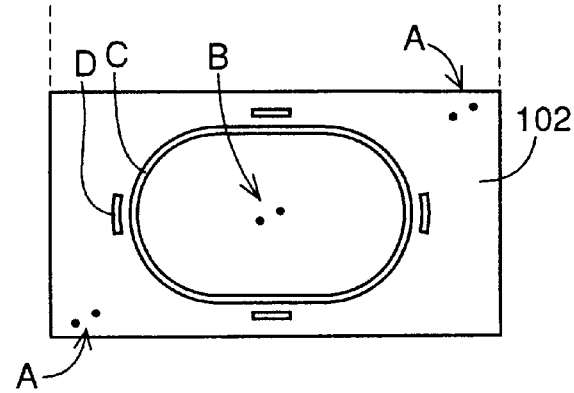

Step S105 in which the sheet blank "n" is laser cut along the predetermined cutting line C is followed by step S106 in which slits D are formed through the sheet blank "n", by laser cutting local portions of the sheet blank "n" along predetermined primary or final bonding lines, as indicated in FIGS. 10A and 10B. The slits D are formed to effect the final or primary bonding of the sheet blanks "n" and "n−1"by laser welding as described below. The final bonding lines are close to but apart from the predetermined cutting line. This laser cutting to form the slits D is effected by the laser beam 34 under the same condition in the laser cutting step S105.

When the value "n" is equal to "2", the slits D are formed in the outer section of the second sheet blank 102, by local laser cutting along the final bonding lines adjacent to the cutting line c, as indicated in FIGS. 10A and 10B. It is noted that no slits D are formed within the inner section of the second sheet blank 102, because this inner section should be separated from the first sheet blank 100 after the product (die set 10, 12) is produced by lamination according to the present process. Namely, the inner section is bonded to the first sheet blank 100 by the preliminary bonding only, with a small welding force.

When the value "n" is equal to "3" or larger, the slits D are formed within the inner section of the sheet blank "n" which is inside the cutting line C. These slits D are also formed by laser cutting along predetermined final bonding lines close to the cutting line C. Thus, the slits D are formed in both of the outer and inner sections of the sheet blank "n", for effecting the final bonding of the sheet blanks "n" and "n−1" in these outer and inner sections of the sheet blank "n".

Then, step S107 is implemented to effect the final bonding of the sheet blanks "n" and "n−1" by laser welding in which local areas surrounding the local slits D formed through the sheet blank "n" are irradiated by the laser beam 34, so that these two sheet blanks "n" and "n−1" are firmly bonded together by the laser welding. The slits D formed prior to this laser welding operation permits irradiation of local areas of the sheet blank "n−1" with the laser beam 34, so that the required laser power for the final or primary bonding operation can be reduced. The provision of the slits D makes it possible to use the same welding apparatus 30 or same torch 36 for performing the laser cutting in step S106 and the laser welding in step S107, with the same laser power and at the same velocity of relative movement of the torch 36 and the sheet blanks.

Figure 11A:
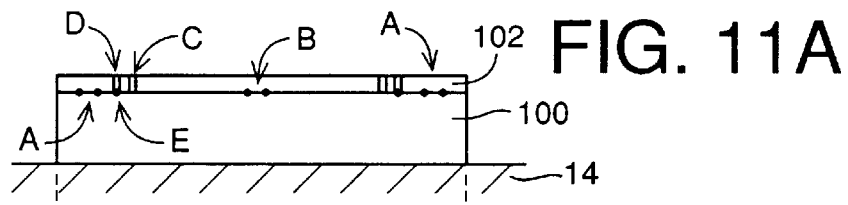
FIGS. 11A and 11B are a front elevational view and a plan view for explaining step S107 of the flow chart of FIG. 4.
Figure 11B:
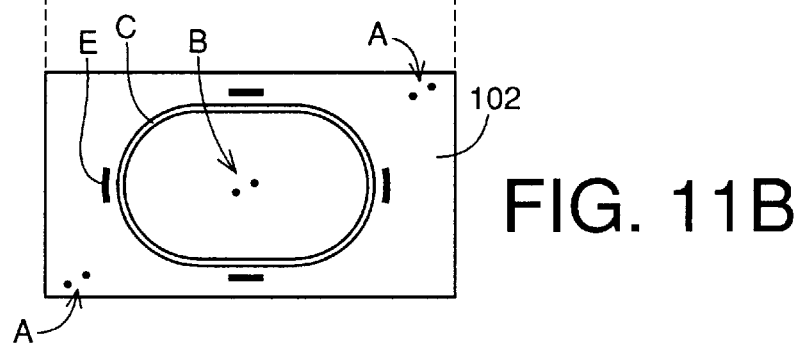

When the value "n" is equal to "2", welding spots E are provided only in the outer section of the second sheet blank 102, as indicated in FIGS. 11A and 11B, for the final bonding of the second sheet blank 102 to the first sheet blank 100. The welding spots E are aligned with the slits D which are formed through the outer section of the sheet blank 102 and are located close to the cutting line C.

Figure 12:
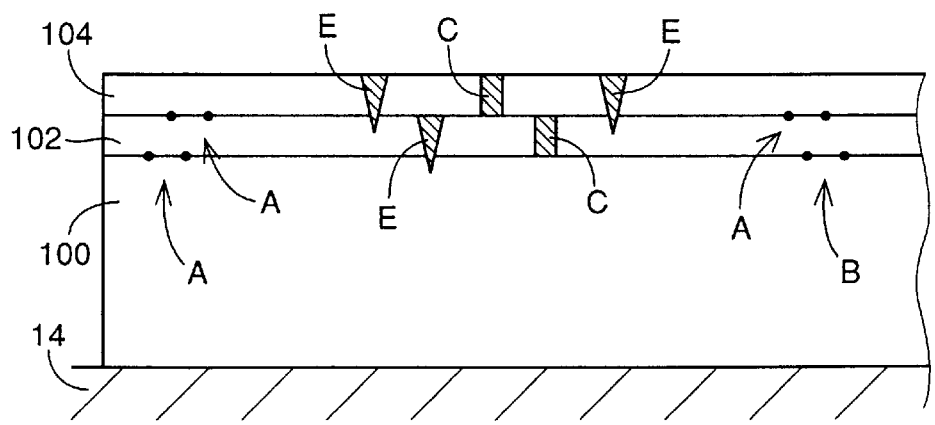
FIG. 12 is a front elevational view in cross section for also explaining the step S107.

When the value "n" is equal to "3", the welding spots E are provided in both of the outer and inner sections of the third sheet blank 104, as indicated in FIG. 12, for the final bonding of the third sheet blank 104 to the second sheet blank 102. These welding spots E are aligned with the slits D which are formed through the outer and inner sections of the third sheet blank 104 and are located close to the cutting line C.

Step S107 is followed by step S108 to determine whether the value "n" is equal to or larger than a predetermined value $n_{MAX}$, which is the number of the sheet blanks "n" which are superposed on each other to produce the desired product, that is, the die set 10, 12 in this specific embodiment. In other words, the value $n_{MAX}$ represents the number of the constituent layers into which the product to be produced is conceptually divided according to the predetermined rule. If a negative decision (NO) is obtained in step S108, step S109 is implemented to increment the value "n". Step S109 is followed by step S103, so that steps S103–S109 are repeatedly implemented. If an affirmative decision (YES) is obtained in step S108, it means that the production of the desired product 10, 12 is completed, as indicated in FIG. 13. In this case, step S108 is followed by step S110 to terminate the laminating operation. Then, step S111 is implemented to move the upper die 12 apart from the lower die 10, for separating these upper and lower dies 12, 10 from each other, as indicated in FIG. 14. Thus, the two dies 10, 12 are produced at the same time. In this respect, each of these two dies 10, 12 can be considered as a product consisting of mutually superposed metal sheets.

It will be understood from the foregoing description of the present embodiment of this invention that the steps S101 and S103 provide a step of superposing a plurality of layer blanks on each other, and the step S104 provides the preliminary bonding step, while the step S105 provides the cutting step. It will also be understood that the step S106 provides a step of forming at least one hole through the uppermost sheet blank "n", and the step 107 provides the final bonding step.

In the cutting step S105, the uppermost one of the already superposed sheet metal blanks in the form of sheets is subjected to the laser cutting along a predetermined cutting line, which laser cutting comprises: irradiating the exposed or top surface of the uppermost sheet blank with a laser beam; moving the laser beam spot along the cutting line; and blowing an assist gas toward the laser beam spot. As a result of irradiation of the uppermost sheet blank with the laser beam along the predetermined cutting line, an opening is formed through the uppermost sheet blank along the cutting line, due to melting of the metal along the cutting line, and the assist gas flows through the slit into a gap between the uppermost sheet blank and the adjacent sheet blank. In the preliminary bonding step S104, the uppermost sheet blank is provisionally bonded to the adjacent sheet blank, by spot welding at predetermined positions or spots which are spaced from the cutting line and. These positions are selected so that the uppermost sheet blank is slightly levitated or warted at a portion thereof near the laser-irradiated portion, apart from the adjacent sheet blank. This technique including the preliminary bonding step and the cutting step is applicable to various operations other than the production of a laminar structure consisting of mutually superposed metallic sheets.

While the presently preferred embodiment of this invention has been described above in detail by reference to the accompanying drawings, it is to be understood that the present invention may be embodied with various changes, modifications and improvements, which may occur to those skilled in the art, without departing from the spirit and scope of the invention defined in the following claims:

What is claimed is:

1. A process of producing a laminar structure including a plurality of metal sheets which are superposed on each other, wherein a plurality of sheet metal blanks corresponding to and having same thickness values as said plurality of metal sheets, respectively, are superposed on each other, said process comprising the steps of:

effecting preliminary bonding of two adjacent ones of said sheet metal blanks including an endmost one of said sheet metal blanks, by welding at predetermined portions of said two adjacent sheet metal blanks, when each of said plurality of sheet metal blanks is superposed as said endmost sheet blank on the other of said two adjacent sheet metal blanks; and cutting said endmost sheet metal blank along a predetermined cutting line, after said preliminary bonding, by a laser beam generated from a laser cutting apparatus such that a spot of said laser beam formed on an exposed surface of said endmost sheet metal blank is moved along said cutting line.

2. A process according to claim 1, wherein said step of effecting preliminary bonding comprises pin-point welding of said two adjacent sheet metal blanks.

3. A process according to claim 1, further comprising a step of determining the thickness values of said plurality of sheet metal blanks such that said two adjacent sheet metal blanks have respective different outlines as seen in a direction of thickness of said sheet metal blanks.

4. A process according to claim 1, wherein said two adjacent sheet metal blanks are welded together in said step of effecting preliminary bonding, at at least one predetermined position which is spaced from said predetermined cutting line of said endmost sheet blank.

5. A process according to claim 1, wherein said step of cutting said endmost sheet metal blank comprises blowing a gas toward said spot of said laser beam, and said step of effecting preliminary bonding comprises welding together said two adjacent sheet metal blanks at at least one predetermined position which is spaced from said predetermined cutting line of said endmost sheet blank, said at least one predetermined position being determined such that a portion of said endmost sheet metal blank adjacent to the spot of said laser beam is warped apart from said other of said two adjacent sheet metal blanks, in the presence of said gas in a gap between said two adjacent sheet metal blanks as a result of a flow of said gas through an opening which is formed through said endmost sheet metal blank due to melting of a metallic material thereof by irradiation with said laser beam.

6. A process according to claim 1, further comprising a step of effecting final bonding of said two adjacent sheet metal blanks, at at least one predetermined position which is close to and spaced from said predetermined cutting line, after said step of cutting said endmost sheet metal blank, when each of said plurality of sheet metal blanks is superposed as said endmost sheet metal blank on said other of said two adjacent sheet metal blanks.

7. A process according to claim 6, further comprising a step of forming at least one hole in at least one portion of said endmost sheet metal blank, respectively, which at least one portion is located at said at least one predetermined position at which said final bonding is effected, said at least one hole being formed by irradiation with a laser beam, and wherein said step of effecting final bonding comprises emitting a laser beam toward each of said at least one hole.

8. A process according to claim 1, wherein said laminar structure includes a plurality of parts which have respective surfaces engageable with each other and which include at least two parts that are formed from said plurality of sheet metal blanks such that said at least two parts engage each other.

9. A process according to claim 8, wherein said plurality of sheet metal blanks include two adjacent blanks which include respective sections which are separated from each other when said at least two parts are separated from each other after said at least two parts have been produced, and said step of effecting preliminary bonding comprises pin-point welding of said sections of said two adjacent blanks.

10. A process of laser cutting an endmost sheet metal blank at an end of a stack of a plurality of sheet metal blanks, along a predetermined cutting line, by a laser beam such a spot of said laser beam formed on an exposed surface of said endmost sheet metal blank is moved along said predetermined cutting line, said process comprising the steps of:

blowing a gas toward said spot of said laser beam while said exposed surface of said endmost sheet metal blank is irradiated by said laser beam along said predetermined cutting line; and effecting preliminary bonding of two adjacent ones of said plurality of sheet metal blanks including said endmost sheet metal blank, by welding at at least one predetermined position which is spaced from said predetermined cutting line of said endmost sheet metal blank, said at least one predetermined position being determined such that a portion of said endmost sheet metal blank which is adjacent to the spot of said laser beam is warped apart from said other of said two adjacent sheet metal blanks, in the presence of said gas in a gap between said two adjacent sheet metal blanks as a result of a flow of said gas through an opening which is formed through said endmost sheet metal blank due to melting of a metallic material thereof by irradiation with said laser beam.

* * * * *

UNITED STATES PATENT AND TRADEMARK OFFICE
CERTIFICATE OF CORRECTION

PATENT NO. : 5,942,138
DATED : August 24, 1999
INVENTOR(S) : Munetaka Toda, et al.

It is certified that error appears in the above-identified patent and that said Letters Patent is hereby corrected as shown below:

ON THE TITLE PAGE:

Item [22], in the Filing Date, "Sep. 8, 1997" should read --Sep. 9, 1997--.

Signed and Sealed this

Sixteenth Day of May, 2000

Attest:

Q. TODD DICKINSON

*Attesting Officer*  *Director of Patents and Trademarks*